US007257495B2

(12) United States Patent
Patten et al.

(10) Patent No.: US 7,257,495 B2
(45) Date of Patent: Aug. 14, 2007

(54) FLOW METER FILTER SYSTEM AND METHOD

(75) Inventors: Andrew Timothy Patten, Boulder, CO (US); Denis M. Henrot, Louisville, CO (US); Craig B. McAnally, Thornton, CO (US); Paul J. Hays, Lafayette, CO (US); Wayne R. Brinkman, Clayton, MO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 10/568,861

(22) PCT Filed: Sep. 5, 2003

(86) PCT No.: PCT/US03/27961

§ 371 (c)(1),
(2), (4) Date: Feb. 21, 2006

(87) PCT Pub. No.: WO2005/033634

PCT Pub. Date: Apr. 14, 2005

(65) Prior Publication Data

US 2006/0265168 A1  Nov. 23, 2006

(51) Int. Cl.
*G06F 19/00* (2006.01)
(52) U.S. Cl. ............ 702/45; 702/100; 73/861.12; 73/861.22; 73/861.29; 73/861.61; 73/861.355; 73/861.356
(58) Field of Classification Search ............. 702/45, 702/100; 73/861.12, 861.22, 861.29, 861.61, 73/861.355, 861.356
See application file for complete search history.

(56) References Cited

U.S. PATENT DOCUMENTS

| | | | | |
|---|---|---|---|---|
| 4,303,980 | A | * | 12/1981 | Yard .......................... 702/49 |
| 4,934,196 | A | * | 6/1990 | Romano ................ 73/861.356 |
| 4,996,871 | A | * | 3/1991 | Romano ..................... 73/32 A |
| 5,388,465 | A | | 2/1995 | Okaniwa et al. |
| 5,550,537 | A | * | 8/1996 | Perdue .................. 340/870.01 |

(Continued)

FOREIGN PATENT DOCUMENTS

EP  0949485 A2  10/1999

*Primary Examiner*—Carol S. W. Tsai
(74) *Attorney, Agent, or Firm*—The Ollila Law Group LLC

(57) ABSTRACT

A flow meter filter system (200) according to an embodiment of the invention includes a noise pass filter (203) configured to receive a first version of a flow meter signal and filter out the flow meter data from the flow meter signal to leave a noise signal, a noise quantifier (204) configured to receive the noise signal from the noise pass filter (203) and measure noise characteristics of the noise signal, a damping adjuster (205) configured to receive the noise characteristics from the noise quantifier (204) and generate a damping value based on the noise characteristics, and a filter element (206) configured to receive a second version of the flow meter signal and receive the damping value from the damping adjuster (205), with the filter element (206) being further configured to damp the second version of the flow meter signal based on the damping value in order to produce a filtered flow meter signal.

16 Claims, 9 Drawing Sheets

U.S. PATENT DOCUMENTS

| | | | |
|---|---|---|---|
| 5,555,190 A * | 9/1996 | Derby et al. | 702/45 |
| 6,502,466 B1 * | 1/2003 | Cage et al. | 73/861.355 |
| 6,505,135 B2 * | 1/2003 | Maginnis | 702/100 |
| 6,594,613 B1 * | 7/2003 | Ley et al. | 702/140 |
| 6,601,005 B1 | 7/2003 | Eryurek et al. | |
| 2002/0170753 A1 * | 11/2002 | Clare | 177/45 |
| 2003/0029249 A1 * | 2/2003 | Keech | 73/861.12 |
| 2003/0154804 A1 * | 8/2003 | Henry et al. | 73/861.356 |
| 2003/0172743 A1 * | 9/2003 | Ao et al. | 73/861.27 |
| 2004/0123666 A1 * | 7/2004 | Ao et al. | 73/644 |
| 2005/0023197 A1 * | 2/2005 | Tariq | 210/100 |
| 2005/0109123 A1 * | 5/2005 | Cheesewright et al. | 73/861.355 |
| 2006/0169058 A1 * | 8/2006 | Gysling | 73/861.355 |

* cited by examiner

FLOW METER FILTER SYSTEM AND METHOD

BACKGROUND OF THE INVENTION

1. Field of the Invention

The invention is related to the field of removing noise from a flow meter signal, and in particular, to removing cyclic noise, such as cross-talk noise, from the flow meter signal.

2. Statement of the Problem

Flow meters are used to measure the mass flow rate, density, and other information for flowing materials. The flowing materials can include liquids, gases, combined liquids and gases, solids suspended in liquids, and liquids including gases and suspended solids. For example, flow meters are widely used in the well production and refining of petroleum and petroleum products. A flow meter can be used to determine well production by measuring a flow rate (i.e., by measuring a mass flow through the flow meter), and can even be used to determine the relative proportions of the gas and liquid components of a flow.

In a production or processing environment, it is common to have multiple flow meters connected to the same process line and/or mounted in such a manner that vibration from one flow meter can reach another flow meter. Although this results in efficiency in measuring flow, the multiple flow meters can interfere with each other in the form of cross-talk noise. Cross-talk is a phenomena when the flow meter signal from a first meter influences and corrupts a flow meter signal from a second flow meter (and vice versa). Cross-talk noise in a flow meter environment commonly is a relatively large, slow-moving signal typically no faster than 1 Hertz (Hz). The noise can degrade accuracy of the flowmeter signal and can lead to extremely large indicated flow errors. In addition, noise can occur due to other factors and other sources.

FIG. 1 is a graph of a flow meter output signal taken over time. The figure shows how a flow meter signal is influenced by other flow meters. The time periods 101 and 103 in the figure show a flow meter signal when three flow meters are generating output, with two other flow meters therefore generating cross-talk noise in the current flow meter output. Time period 102 is a flow meter signal when only one other interfering flow meter is active. Note that the generated noise varies in both amplitude and frequency throughout the graph.

The prior art has attempted to address noise and cross-talk noise through use of traditional filtering techniques, such as high-pass filtering. However, due to the relatively small difference in frequencies between cross-talk noise and the actual flow meter data, and due to the low frequency data signals outputted by flow meters, it has been difficult to remove noise without degrading the flow meter data.

SUMMARY OF THE SOLUTION

The invention helps solve the above problems with removing noise from a flow meter signal.

A flow meter filter system (200) is provided according to an embodiment of the invention. The flow meter filter system (200) comprises a noise pass filter (203) configured to receive a first version of a flow meter signal and filter out the flow meter data from the flow meter signal to leave a noise signal. The flow meter filter system (200) further comprises a noise quantifier (204) configured to receive the noise signal from the noise pass filter (203) and measure noise characteristics of the noise signal. The flow meter filter system (200) further comprises a damping adjuster (205) configured to receive the noise characteristics from the noise quantifier (204) and generate a damping value based on the noise characteristics. The flow meter filter system (200) further comprises a filter element (206) configured to receive a second version of the flow meter signal and receive the damping value from the damping adjuster (205), with the filter element (206) being further configured to damp the second version of the flow meter signal based on the damping value in order to produce a filtered flow meter signal.

A method of removing noise from a flow meter signal is provided according to an embodiment of the invention. The method comprises the steps of receiving the flow meter signal, applying a large damping value to the flow meter signal in order to produce a filtered flow meter signal if the flow meter signal is substantially quiescent, and applying a small damping value to the flow meter signal in order to produce the filtered flow meter signal if the flow meter signal is experiencing a transition.

A method of removing noise from a flow meter signal is provided according to an embodiment of the invention. The method comprises the steps of receiving the flow meter signal, filtering a noise signal substantially out of a first version of the flow meter signal, measuring the noise signal to obtain noise characteristics, determining a damping value from the noise characteristics, with the damping value being selected to substantially remove the noise signal from the flow meter signal, and damping the noise substantially out of a second version of the flow meter signal using the damping value in order to produce a filtered flow meter signal.

One aspect of the invention comprises normalizing the flow meter signal from an original value to a normalized value prior to the damping, and scaling the filtered flow meter signal of the damping step substantially back to the original flow meter signal magnitude.

In another aspect of the invention, the method determines an error value between the second version of the flow meter signal and the filtered flow meter signal, and feeds the error value back into the determining of the damping value, wherein the error value is included in the damping value determination.

In another aspect of the invention, the noise pass filter and the filter element comprise digital filters.

In another aspect of the invention, the noise pass filter and the filter element comprise Infinite Impulse Response (IIR) digital filters.

In another aspect of the invention, the noise pass filter and the filter element comprise second-order IIR digital filters.

In another aspect of the invention, the damping adjuster is further configured to generate the damping value based on the noise characteristics and on a damping delay coefficient.

In another aspect of the invention, the flow meter signal comprises a Coriolis flow meter signal.

DESCRIPTION OF THE DRAWINGS

The same reference number represents the same element on all drawings.

DETAILED DESCRIPTION OF THE INVENTION

FIGS. 2-9 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
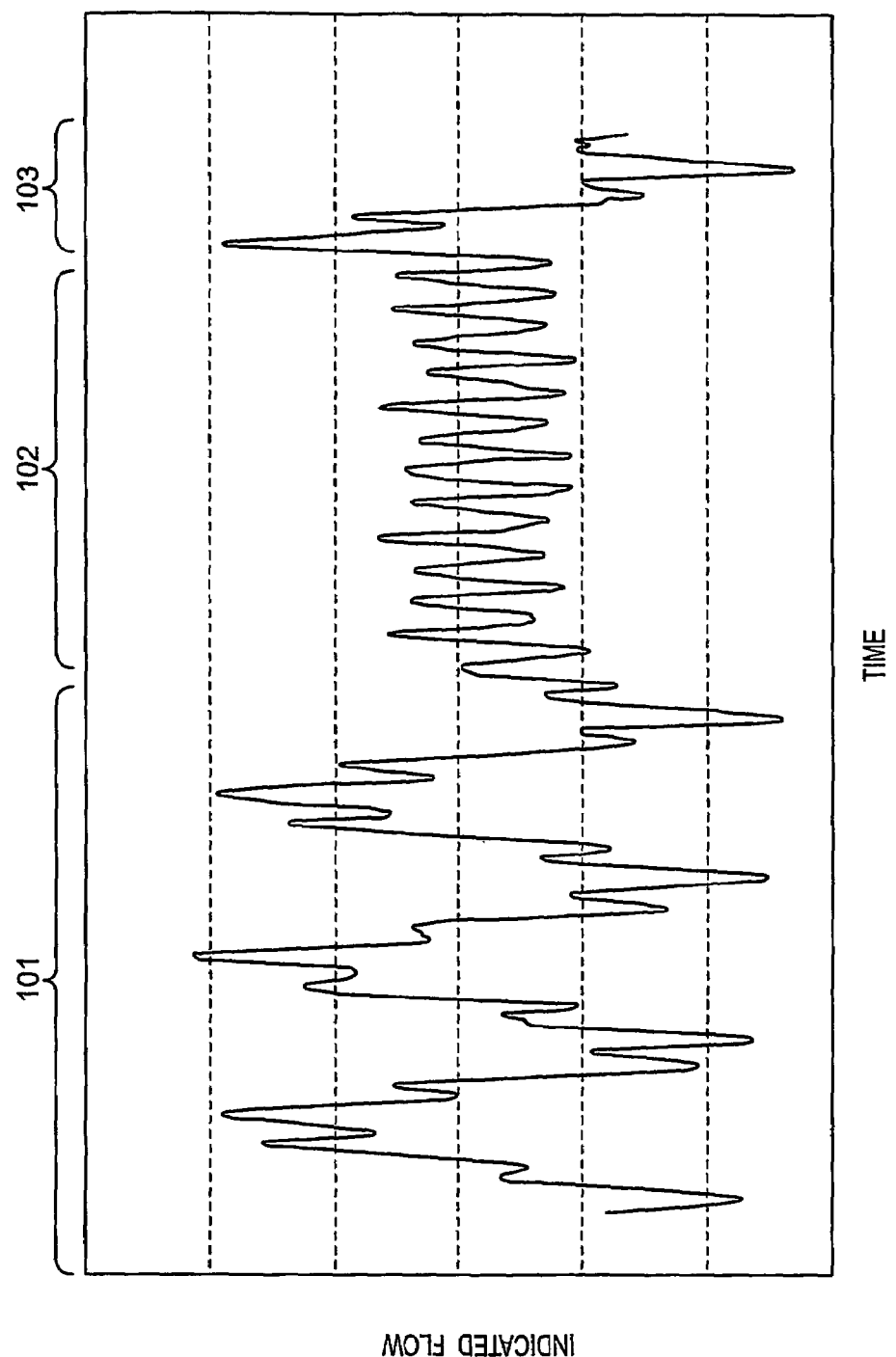
FIG. 1 is a graph of a flow meter output signal taken over time.
Figure 2:
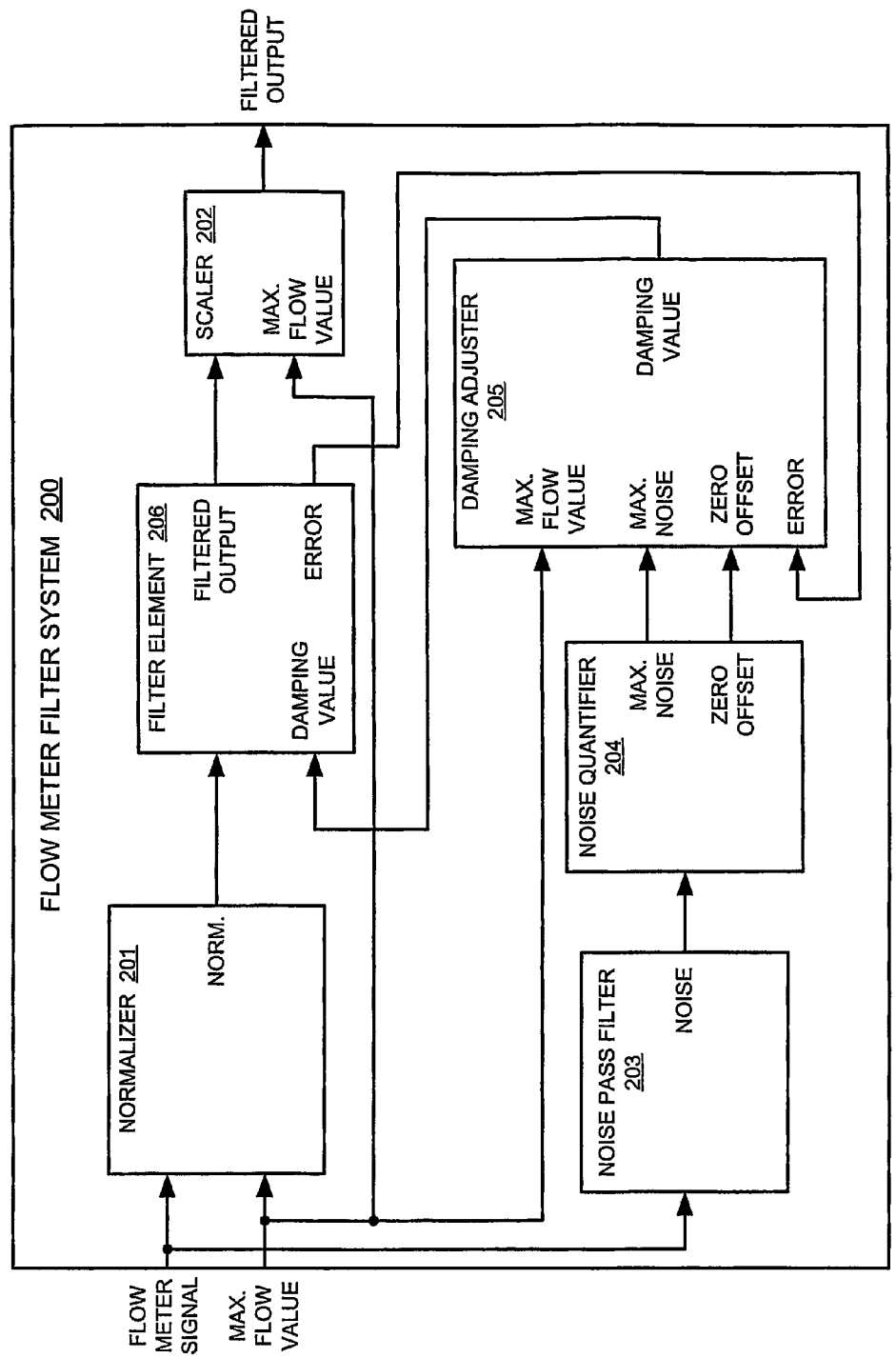
FIG. 2 is a flow meter filter system according to an embodiment of the invention.

Flow Meter Filter System—FIG. 2

FIG. 2 is a flow meter filter system 200 according to an embodiment of the invention. The flow meter filter system 200 receives a flow meter signal from one or more flow meters and substantially filters out noise in the flow meter signal. The flow meters can comprise any type of flow meter, including Coriolis flow meters, turbine flow meters, magnetic flow meters, etc. The flow meter filter system 200 in the embodiment shown includes a normalizer 201, a scaler 202, a noise pass filter 203, a noise quantifier 204, a damping adjuster 205, and a filter element 206. It should be understood that other flow meter filter configurations are contemplated, and the embodiment shown is provided for illustration.

The normalizer 201 receives the flow meter signal and a maximum flow value, and has an output that is connected to the filter element 206. The noise pass filter 203 also receives the flow meter signal (i.e., a first version of the flow meter signal), and has an output that is connected to the noise quantifier 204. The noise quantifier 204 receives the output of the noise pass filter 203, and has a maximum noise output and a zero offset output that are connected to the damping adjuster 205. The damping adjuster 205 also receives the maximum flow value, receives the maximum noise output and the zero offset outputted from the noise quantifier 204, and receives an error value outputted from the filter element 206. The damping adjuster 205 has a damping value output. The filter element 206 receives the normalized flow meter signal (i.e., a second version of the flow meter signal) outputted from the normalizer 201 and the damping value outputted from the damping adjuster 205, and has as outputs the error value and a filtered flow meter signal with the noise damped out. The scaler 202 receives the filtered flow meter signal that is outputted from the filter element 206 and also receives a version of the maximum flow value, and outputs a scaled, filtered version of the flow meter signal.

In operation, a flow meter signal is input into the flow meter filter system 200. The flow meter filter system 200 measures noise characteristics of the noise, and from the noise characteristics determines a damping value that is input into the filter element 206. The filter element 206 damps the flow meter signal according to the damping value. The noise, such as cross-talk noise, is typically of a faster frequency/response time than the flow meter data output and therefore is damped out by the filter element 206. The flow meter filter system 200 therefore removes the noise without substantially affecting or degrading the flow meter data.

In addition to filtering cross-talk noise, the flow meter filter system 200 is also capable of minimizing external noise from other sources, such as from physical movement or vibration. For example, a positive displacement pump puts cyclic variation into the flow being measured. In some cases, it is advantageous to eliminate this cyclic noise in order to measure and report only the average flow signal.

Damping refers to preventing changes in signal swing based on frequency. Damping can be used to remove a noise signal when the noise signal is changing at a faster rate than an underlying flow meter signal. Damping can therefore remove a noise signal superimposed on a flow meter data signal. The damping value can be selected from a table, for example. The selection can be based on one or more inputs, such as a noise amplitude range (see Table 1 and accompanying discussion below). In a digital filter embodiment, the damping value can represent filter coefficients.

However, in order to prevent the damping from adversely influencing/degrading the flow meter signal when a flow rate change occurs, the damping value can be selected to be less during a transition in the flow meter signal. A transition is a relatively large or rapid change in the flow meter data. For example, a transition can occur when a flow meter is taken on-line or off-line, when the quantity of flow material passing through a flow meter changes by a significant amount, when bubbles or pockets of gas are present in a liquid flow material, etc. In one embodiment, the response time of the flow meter filter system 200 is reduced during transitions. Therefore, the noise is damped out at a lesser level until the transition has passed and the flow meter signal has again become substantially quiescent (i.e., stable). At that time, the damping value can be increased. The damping according to the invention is therefore dynamically controlled in order to optimally damp out most or all of the noise signal.

The normalizer 201 converts the flow meter signal into a normalized flow meter signal, based upon the inputted maximum flow value. The maximum flow value is an upper limit on the flow meter signal, and can be a value determined by a calibration process, set according to a meter type or a flow material type, etc. The maximum flow value can be a constant, or can be time-variable and changeable. Using the maximum flow value, the normalizer 201 normalizes the flow meter signal input to be no greater than the maximum flow value. This can be done so that the flow meter filter system 200 can be used with any type of flow meter and any flow signal level, i.e., the flow meter filter system 200 is independent of the type of flow meter and the flow conditions. In one embodiment, the normalization is done according to the formula:

$$\text{Normalized\_Flow} = \frac{\text{Flow\_Meter\_Signal}}{\text{Max\_Flow\_Value}} \quad (1)$$

The scaler 202 is the complement of the normalizer 201. The scaler 202 receives the filtered, normalized flow meter signal from the filter element 206 and scales it back to substantially the same amplitude as the inputted flow meter signal. This is done by multiplying the filtered output by the maximum flow value. The multiplication by the maximum flow value is the complement of the division of the flow meter signal by the maximum flow value in the normalizer 201.

The noise pass filter 203 receives the non-normalized flow meter signal (a second version) and passes only a noise signal (i.e., the flow meter data is blocked). The purpose of the noise pass filter 203 is to determine the magnitude of any cross-talk noise present in the flow meter signal. The noise pass filter 203 can be any filter that substantially passes frequencies in the range of about 0.025 Hertz (Hz) to about 1 Hz, such as an implementation of a high pass or band-pass filter, for example. In one embodiment, the noise pass filter 203 comprises an Alternating Current (AC) coupling filter (i.e., an analog filter). In another embodiment the noise pass filter 203 comprises an Infinite Impulse Response (IIR) digital filter, including a second-order IIR digital filter.

The noise pass filter 203 preferably has filter coefficients that have been selected to provide unity gain and a zero phase for frequencies above 0.025 Hz. In one embodiment, the noise pass filter 203 has a transfer function represented by:

$$H(Z) = \frac{0.9993 - 1.9986 * Z^{-1} + 0.9993 * Z^{-2}}{1 - 1.9986 * Z^{-1} + 0.9986 * Z^{-2}} \quad (2)$$

where the Z transform variable $Z^{-1}$ is a previous output at time (t−1), the Z transform variable $Z^{-2}$ is a previous output at time (t−2), and the numerical values 0.9993, 1.9986, etc., are the filter coefficients. The Z transform variable is commonly used to represent;

$$Z = e^{-j\omega} \quad (3)$$

It should be understood that the numerical filter coefficients given above are just an example provided for illustration, and the invention is not limited to the values given. The filter coefficients can be varied according to the type of filter, the number of filters generating noise, flow conditions, environmental conditions, etc.

Figure 3:
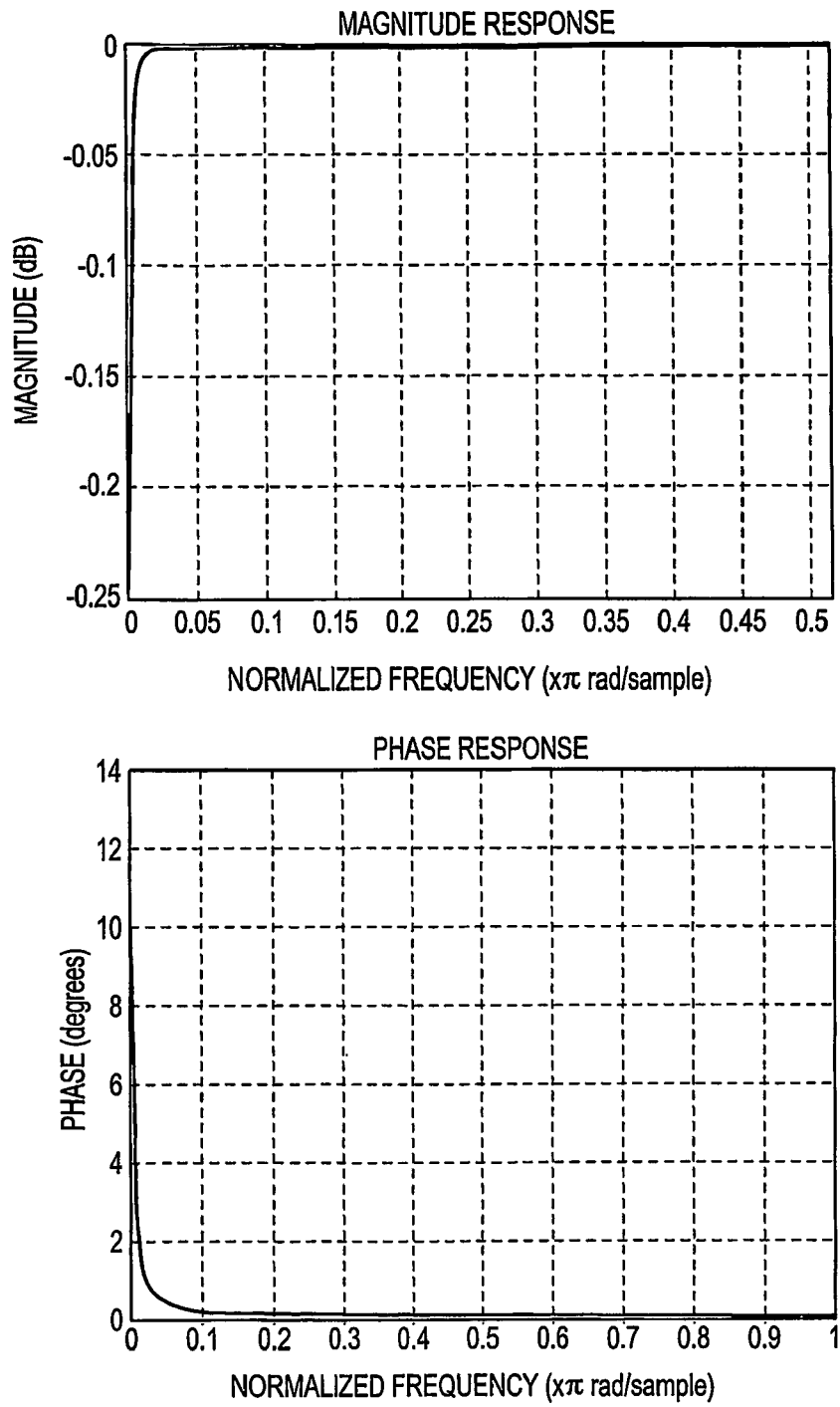
FIG. 3 shows the magnitude and phase responses for the noise pass filter according to one embodiment of the invention.

Noise Pass Filter Magnitude and Phase Graphs—FIG. 3

FIG. 3 shows the magnitude and phase responses for the noise pass filter 203 according to one embodiment of the invention. In the example shown, the frequency has been normalized to a value of one. Because the noise pass filter 203 response at the low end of the frequency range is the main concern, it is possible in a digital filter embodiment to improve the performance of the noise pass filter 203 by adjusting the sampling rate of the input signal. Ideally, the noise pass filter 203 should not attenuate the noise signal component and would output a noise component having a magnitude of 0 dB and a zero degree phase shift at frequencies above 0.025 Hz. With a 20 Hz sampling rate, the output magnitude of a 0.20 Hz noise signal in an actual digital filter implementation has been measured at about −0.22 dB. With a sampling rate of 5 Hz, the magnitude has been measured at about −0.0141 dB, a significant improvement. However, a down side of a slower sampling rate is a larger delay in response time. The sampling rate is therefore an adjustable parameter that can be configured during calibration or during operation.

Referring again to FIG. 2, the noise quantifier 204 measures the noise signal outputted by the noise pass filter 203 and generates noise characteristics of the noise signal. In one embodiment, the noise quantifier 204 measures a maximum noise level and a zero offset level of the noise signal (i.e., an offset from zero of an average noise content). The zero offset/average noise content serves as an indicator as to whether the noise pass filter 203 has settled down to a substantially constant (i.e., quiescent) state (see FIG. 8 and the accompanying discussion).

The noise quantifier 204 in one embodiment accumulates noise data over a sample period and measures the noise characteristics for the sample period. This can be done in order to accurately characterize the noise and to prevent noise anomalies from unduly affecting the characterization. Since the slowest expected noise signal is defined as at least 0.025 Hz (which gives a wave period of 40 seconds), it is important to compute the average noise content value on a sample that contains at least 40 seconds of data.

The damping adjuster 205 generates a damping value that is used to damp the noise out of the flow meter signal. The purpose of the damping adjuster 205 is to adaptively change the damping value of the filter element 206 based on current noise levels and current flow variations. The damping adjuster 205 receives as inputs the noise characteristics from the noise quantifier 204 and the maximum flow value, along with an error value generated by the filter element 206. The error value comprises feedback on how completely the noise is being damped out of the normalized flow meter signal. The damping adjuster divides the zero offset by the maximum flow value in order to determine whether the noise signal is substantially centered around zero (i.e., the damping adjuster 205 determines if the average noise content is below a predetermined quiescent threshold). One embodiment of the damping adjuster 205 is discussed in detail below in conjunction with FIG. 7.

The damping adjuster 205 in one embodiment uses the inputted noise and error values as inputs into a damping values table and looks up an appropriate damping value. Table 1 below is an example of one embodiment of a damping value table.

TABLE 1

| Damping Value | Lower Range | Upper Range |
|---|---|---|
| 0 | NC * (1 + RC * 0.256) | |
| 1 | NC * (1 + RC * 0.128) | NC * (1 + RC * 0.256) |
| 2 | NC * (1 + RC * 0.064) | NC * (1 + RC * 0.128) |
| 4 | NC * (1 + RC * 0.032) | NC * (1 + RC * 0.064) |
| 8 | NC * (1 + RC * 0.016) | NC * (1 + RC * 0.032) |
| 16 | NC * (1 + RC * 0.008) | NC * (1 + RC * 0.016) |
| 32 | NC * (1 + RC * 0.004) | NC * (1 + RC * 0.008) |
| 64 | NC * (1 + RC * 0.002) | NC * (1 + RC * 0.004) |
| 128 | NC * (1 + RC * 0.001) | NC * (1 + RC * 0.002) |
| 256 | NC * (1 + RC * 0.0005) | NC * (1 + RC * 0.001) |
| 512 | | NC * (1 + RC * 0.0005) | where NC is the normalized noise data constant which is the noise floor and RC is a predetermined scaling constant. The predetermined scaling constant RC is an optional feature, and can be included in order to make global scaling changes to the table. The normalized error value is compared to the lookup table to determine the damping value.

The damping adjuster 205 in one embodiment can ramp the damping value from a current damping value to a new damping value, and may not immediately make a full change in the damping value. While it is important to allow quick transitions from slow to fast damping values, it is also important to limit how fast the damping adjuster 205 moves back to slow damping values. If the new damping value is faster than the preceding damping value (i.e., it is a smaller damping value), then the new damping value gets sent directly to the filter element 206. However, if the new damping value is slower than the preceding damping value (i.e., it is a larger damping value), then the outputted damping value is slowly ramped up to the new damping value (see FIG. 7 and the accompanying discussion).

The filter element 206 is configured to receive the damping value and damp the normalized flow meter signal. The filter element 206 in one embodiment comprises a second-order filter. In another embodiment, the filter element 206 comprises an IIR digital filter, including a second-order IIR digital filter. An advantage of using a digital filter, as opposed to an analog filter, is that the digital filter can be dynamically controlled during operation. Therefore, the amount of damping can be changed in order to optimally remove noise without influencing the flow meter data signal. In one embodiment, the filter element 206 comprises a second-order IIR digital filter that has the transfer functions of:

$$X_t = X_{t-1} + \frac{(U_t - X_{t-1})}{\text{Damping\_Value}} \quad (4)$$

and $$Y_t = Y_{t-1} + \frac{(X_t - Y_{t-1})}{\text{Damping\_Value}} \quad (5)$$

Where t is a time sample value, $U_t$ is a current input sample, $X_t$ is determined from the current input sample $U_t$ and a previous X value $X_{t-1}$, and $Y_t$ is defined as the output determined from the current input sample $U_t$, the computed value $X_t$, and the previous output value $Y_{t-1}$. A digital filter such as the one described above can be implemented in a processing system, such as in a Digital Signal Processor (DSP) device, for example.

Figure 4:
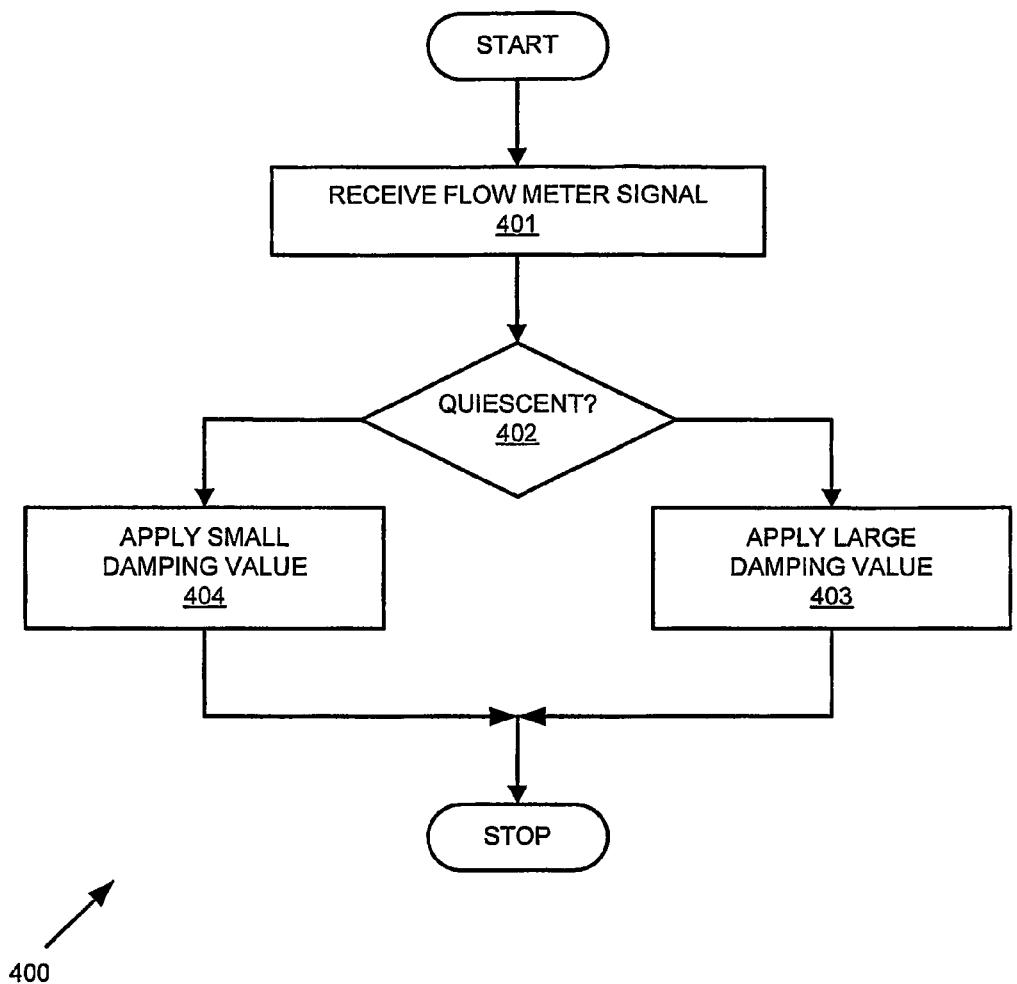
FIG. 4 is a flowchart of a method of removing noise from a flow meter signal according to another embodiment of the invention.

Flow Meter Filtering Method—FIG. 4

FIG. 4 is a flowchart 400 of a method of removing noise from a flow meter signal according to an embodiment of the invention. In step 401, a flow meter signal is received. The flow meter signal can be pre-processed in any manner, including normalization of the flow meter signal.

In step 402, if the flow meter signal is substantially quiescent, the method branches to step 403; otherwise the method branches to step 404.

In step 403, because the flow meter signal is substantially quiescent, a large damping value is applied to the flow meter signal. Because the flow meter signal is changing relatively slowly, a large amount of damping can be applied without affecting the flow meter data in the flow meter signal, and only the noise component of the flow meter signal is attenuated by the heavy damping.

In step 404, because the flow meter signal is experiencing large or rapid changes in value, a small damping value is applied to the flow meter signal. In this manner, the noise component of the flow meter signal is substantially removed but without affecting the flow meter data.

Figure 5:
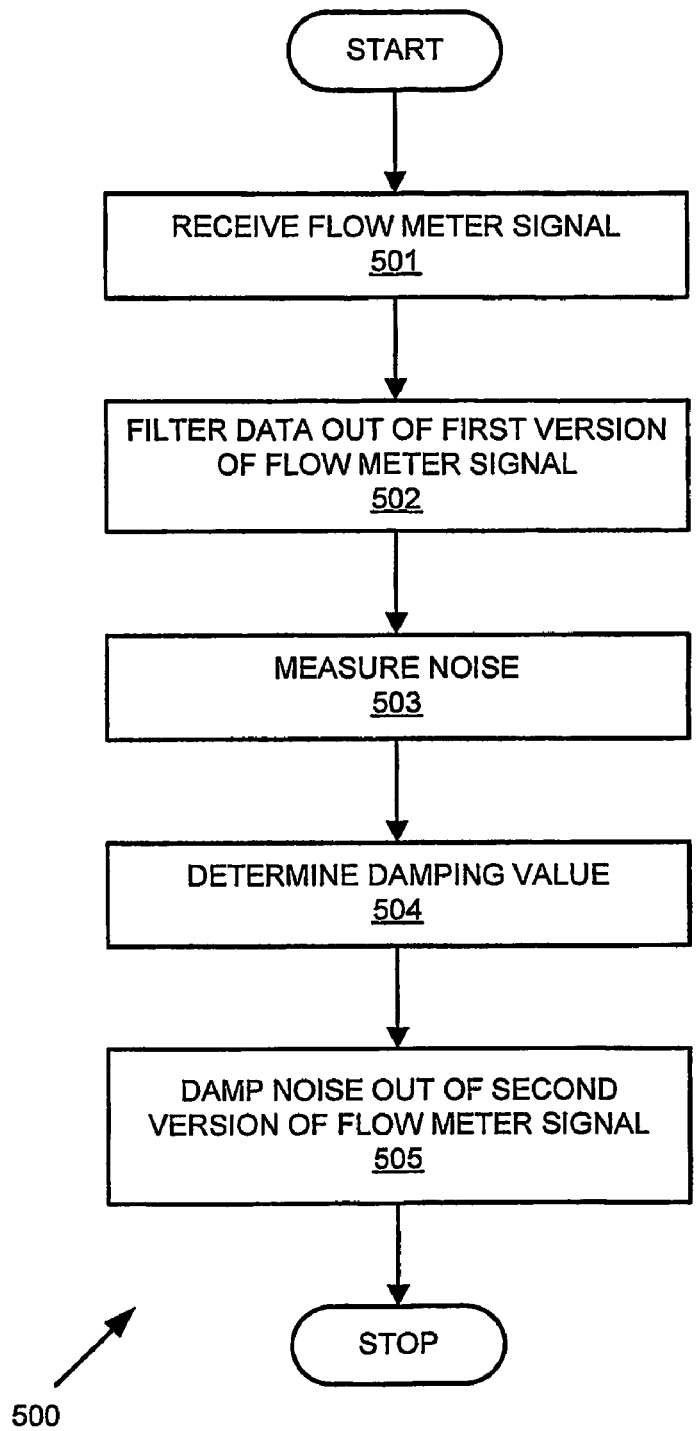
FIG. 5 is a flowchart of a method of removing noise from a flow meter signal according to an embodiment of the invention.

Flow Meter Filtering Method—FIG. 5

FIG. 5 is a flowchart 500 of a method of removing noise from a flow meter signal according to another embodiment of the invention. In step 501, a flow meter signal is received, as previously discussed.

In step 502, the flow meter data is substantially filtered out of a first version of the flow meter signal in order to obtain a substantially pure noise signal. The measurement can be performed in order to characterize the noise and dynamically damp the noise out of the flow meter signal. For example, the data can be removed by a high pass or band-pass filter, as previously discussed.

In step 503, the noise is measured and noise characteristics are thereby obtained. The noise characteristics can include a maximum noise amplitude and a zero offset, as previously discussed. It should be understood that the noise characteristics are dynamic and can change over time. For example, the noise characteristics commonly vary when other flow meters are connected in the process line and therefore generating cross-talk noise. However, other noise sources are also contemplated, such as environmental noise from pumping equipment, for instance.

In step 504, a damping value is determined from the current noise characteristics. The damping value represents an amount of damping that will substantially remove the noise from the flow meter signal but without substantially impacting the flow meter signal.

In step 505, the damping value and the flow meter signal are inputted into a filter element 206 and the filter element 206 damps out the noise using the damping value. In addition, the damping can be ramped from a current damping value to a new damping value.

Figure 6:
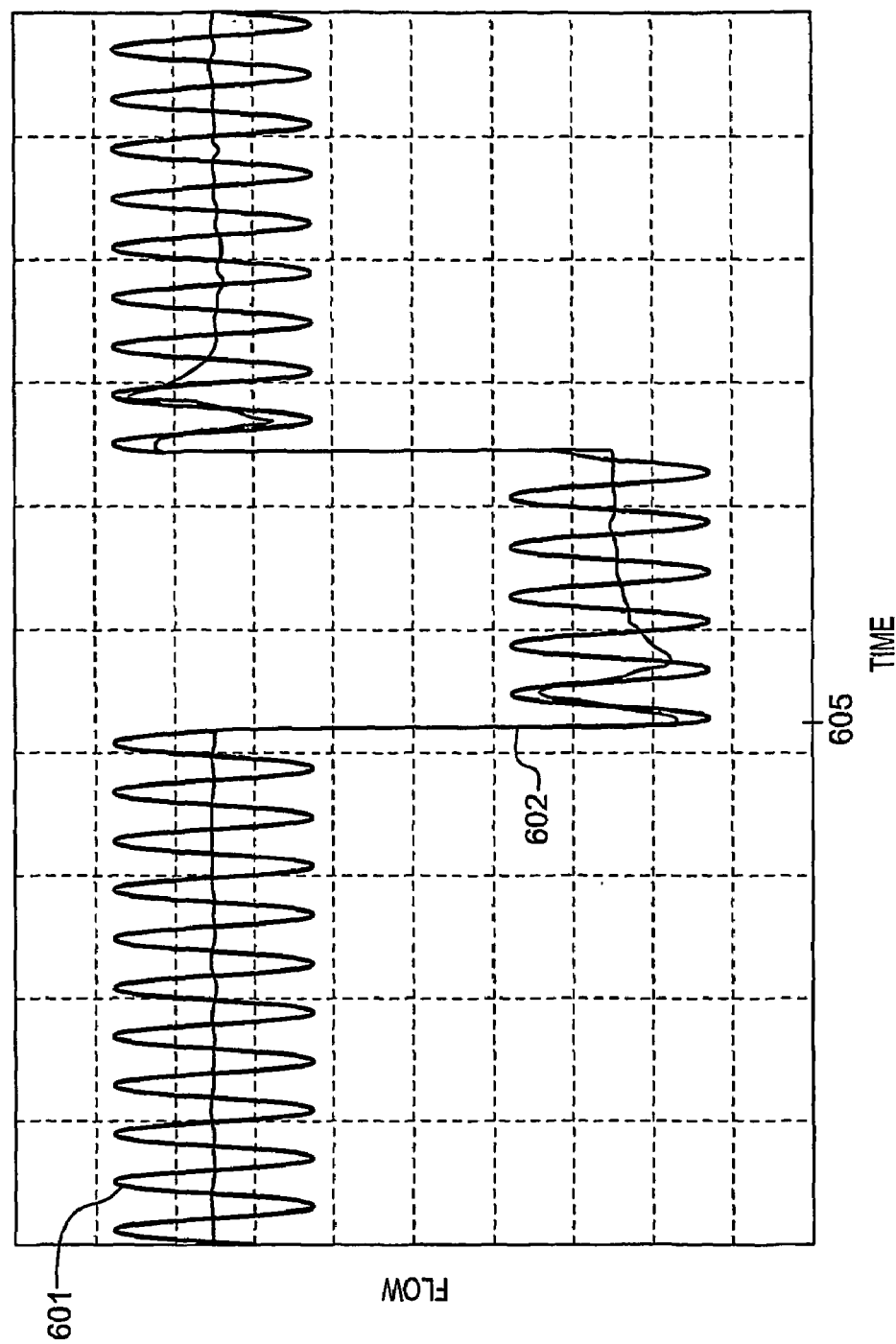
FIG. 6 is a graph that illustrates damping removal of noise from a flow meter signal.

Graph of Damping Effect—FIG. 6

FIG. 6 is a graph that illustrates damping removal of noise from a flow meter signal. The graph includes a flow meter signal 601 and a noise signal 602. It can be seen from the figure that when the noise signal 602 is damped out, the flow meter signal 601 can approximate a square wave. When a step change occurs at time 605, the filter system's response time changes to a very fast response time filter. During this time, the filtered signal will more closely resemble the original flow meter signal until eventually the filter system 200 reverts back to a heavily damped signal.

Figure 7:
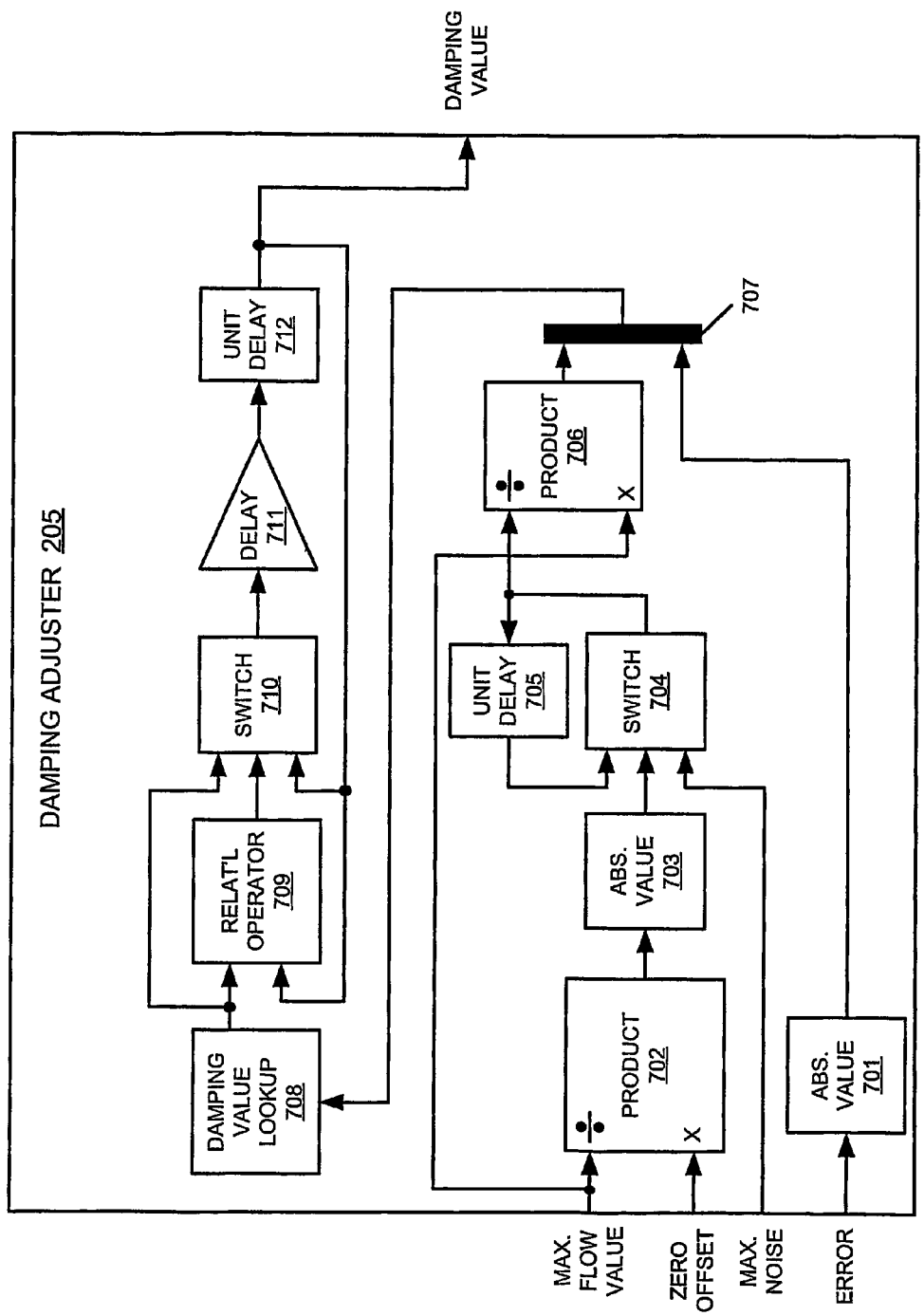
FIG. 7 is a diagram of the damping adjuster according to an embodiment of the invention.

Damping Adjuster—FIG. 7

FIG. 7 is a diagram of the damping adjuster 205 according to an embodiment of the invention. The damping adjuster 205 in this embodiment includes absolute value blocks 701 and 703, product blocks 702 and 706, switching blocks 704 and 710, unit delay blocks 705 and 712 (such as 1/Z unit delay blocks, for example), an interface 707, a damping value block 708, a relational operator block 709, and a damping delay coefficient block 711. The damping adjuster 205 includes the error, maximum noise, maximum flow value, and zero offset inputs as previously discussed, and outputs the damping value.

The product block 702 divides the zero offset by the maximum flow value in order to generate a noise value. The noise value is representative of the average noise content and indicates the distance from the noise signal to zero. If this noise value is less than a predetermined quiescent threshold, then the noise level is determined to be substantially quiescent and is therefore accurate enough to be used in the damping value lookup block 708.

The absolute value blocks 701 and 703 take the absolute values of their respective inputs. The absolute value block 703 outputs a positive noise value to the switching block 705. The absolute value block 701 outputs a positive error value to the interface 707.

The switching block 704 receives the maximum noise value, the noise value, and a unit delay produced by the unit delay block 705. The switching block 704 is configured to output the noise value if the noise value is less than the maximum noise value, and output the maximum noise value otherwise. In addition, the switching block 704 can output the previous switch output (from the unit delay block 705) when not outputting either the noise value or the maximum noise value. The output of the switching block 704 is connected to the input of the unit delay block 705 and to the product block 706.

The product block 706 also receives the noise value and the maximum flow value. The product block 706 divides the maximum flow value by the noise value in order to produce a normalized noise value that is outputted to the interface 707.

The interface 707 passes the normalized error signal and the normalized noise signal to the damping value lookup block 708. The interface 707 in one embodiment multiplexes the normalized noise signal and the normalized error signal into a vector format, wherein the damping value lookup block 708 receives a single input.

The damping value lookup block 708 generates the damping value from the normalized error and normalized noise inputs. In one embodiment, the damping value lookup block 708 performs a table lookup in order to obtain the damping value, such as Table 1, discussed in conjunction with FIG. 2, above. The damping value lookup block 708 outputs the damping value to the relational operator block 709.

The final stage of the damping adjuster 205 (i.e., the components 709-712) control the rate at which the damping value can be changed. The relational operator block 709 compares the new damping value (outputted by the damping value lookup block 708) to the current damping value available at the output of the damping adjuster 205. The relational operator block 709 generates a relational output that indicates whether the new damping value is smaller than the current damping value.

The switching block 710 has as inputs the new damping value, the current damping value, and the relational output. The switching block 710 is configured to select and output either the new damping value or the current damping value, depending on the relational output. If the new damping value is smaller than the current damping value, then the switching block 710 feeds the new damping value directly to the output. However, if the new damping value is larger than the current damping value, then the switching block 710 channels the new damping value through the damping delay coefficient 711 and the unit delay 712 and ramps the damping value output from the current damping value to the new damping value by multiplying the new damping value by a delay coefficient. The switching block 710 outputs the selected damping value to the damping delay coefficient 711.

The damping delay coefficient 711 defines a damping rate and controls how quickly the damping adjuster 205 can ramp to the new damping value. The damping delay coefficient 711 in one embodiment is a number slightly larger than one. The output of the damping delay coefficient 711 is inputted into the unit delay 712.

The unit delay 712 delays the damping value by a predetermined delay period. The predetermined delay period can be a constant value, for example, or can be obtained from a table. The output of the unit delay 712 is the damping value output of the damping adjuster 205. The damping adjuster 205 therefore generates the damping value based on the noise characteristics and on the damping delay coefficient 711.

Figure 8:
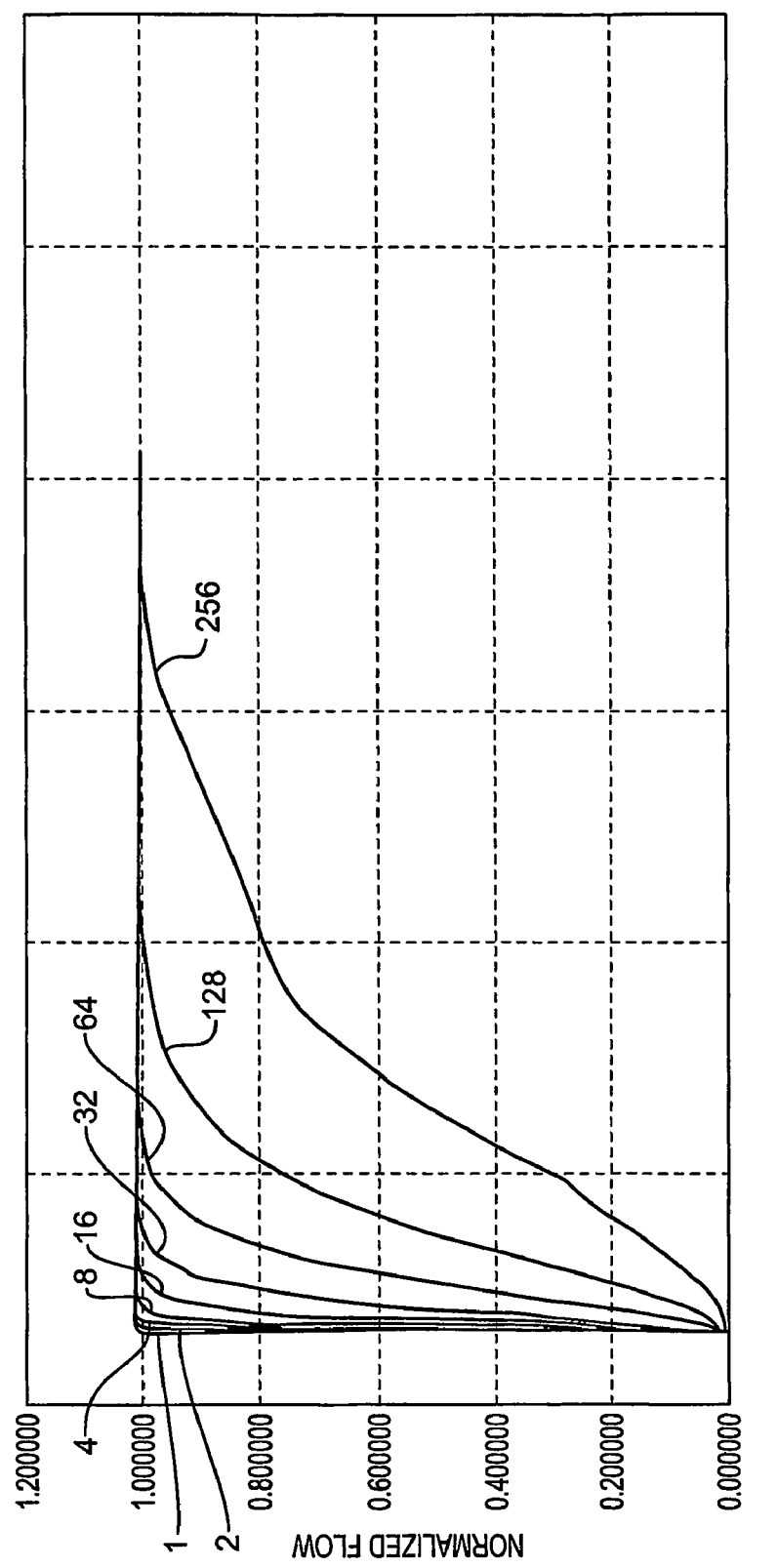
FIG. 8 is a graph of various damping values that can be implemented in the flow meter filter system according to an embodiment of the invention.

Graph of Damping Values—FIG. 8

FIG. 8 is a graph of various damping values that can be implemented in the flow meter filter system 200 according to an embodiment of the invention. The figure shows normalized flow rate over time for various damping values. It can be seen that a damping value can be selected not only based on the desired amount of damping, but on the time period required in order to achieve the desired noise damping. For example, a damping value of 1 has a much faster response than a damping value of 256.

Figure 9:
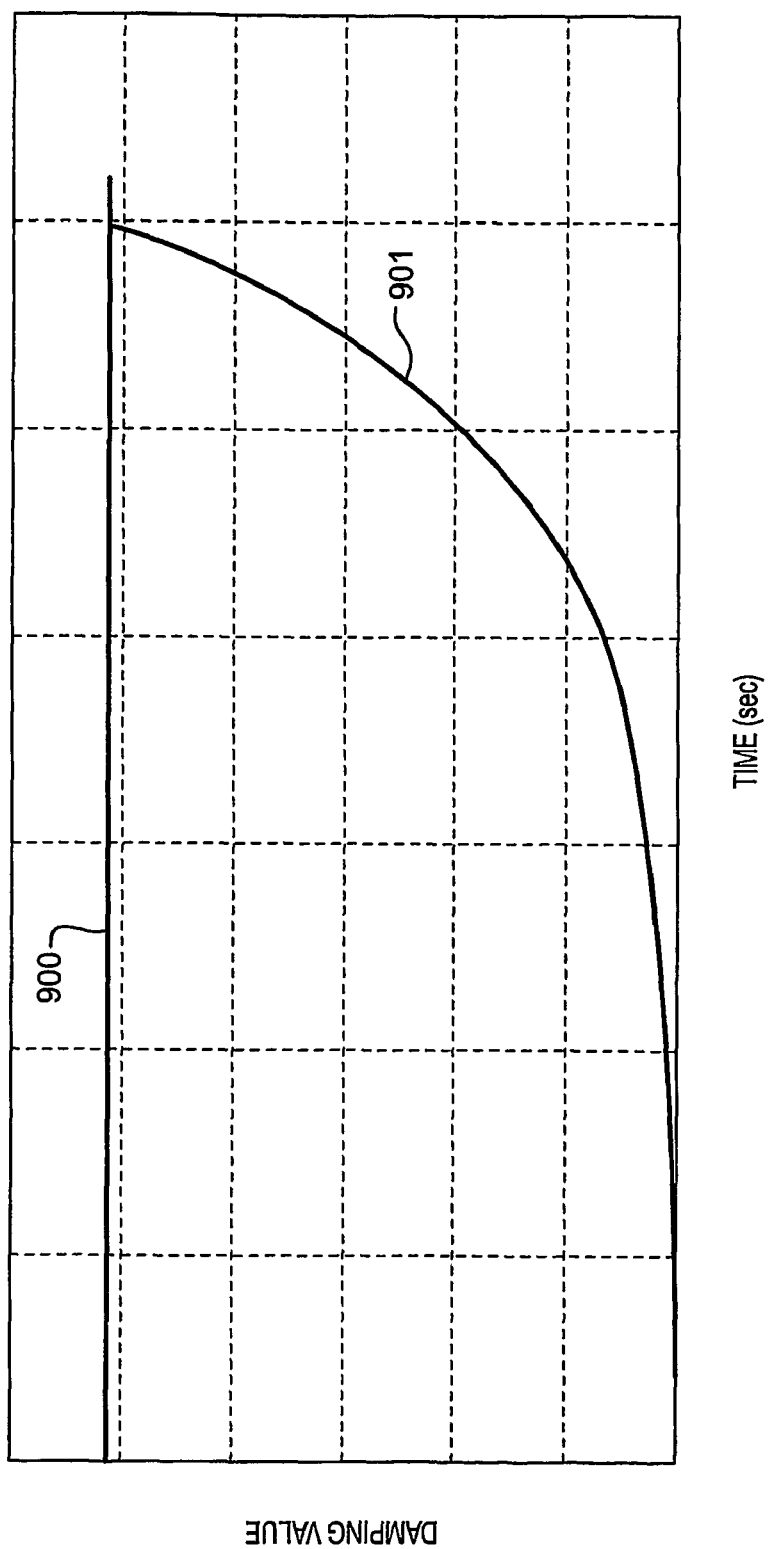
FIG. 9 is a graph that shows a ramping of the damping value according to an embodiment of the invention.

Graph of Damping Value Ramping—FIG. 9

FIG. 9 is a graph that shows a ramping of the damping value according to an embodiment of the invention. The straight line 900 is a desired damping value, while the curve 901 is a damping value that is being ramped up over time. The ramping rate can be selected in order to ramp from a beginning point to the target damping value over a predetermined period of time.

Advantageously, the flow meter filtering according to the invention enables noise to be filtered out of a flow meter signal, including cross-talk noise. The filtering is accomplished without degrading the flow meter data in the flow meter signal. In addition, the filtering accommodates data transitions in the flow meter data.

Another advantage provided by the invention is size. Analog filters constructed for low frequencies typically require physically large components. A digital filter implementation according to some of the described embodiments accomplishes more optimal filtering, but with physically smaller components. In some embodiments, the flow meter filter system 200 can be implemented in an Application Specific Integrated Circuit (ASIC), for example.

Another advantage of using a digital filter, as opposed to an analog filter, is that the digital filter can be dynamically controlled during operation. The filtering can be dynamically controlled according to noise conditions and according to flow conditions/levels. Therefore, the amount of damping can be changed in order to optimally remove noise without influencing the flow meter data signal. This is in contrast to an analog filtering scheme, wherein a fixed amount of filtering is performed. Such a fixed filtering scheme only works well when the data signal and the noise signal are predictable and well-behaved.

What is claimed is:

1. A flow meter filter system (200) comprising:
   a noise pass filter (203) configured to receive a first version of a flow meter signal and filter out the flow meter data from the flow meter signal to leave a noise signal;
   a noise quantifier (204) configured to receive the noise signal from the noise pass filter (203) and measure noise characteristics of the noise signal;
   a damping adjuster (205) configured to receive the noise characteristics from the noise quantifier (204) and generate a damping value based on the noise characteristics; and a filter element (206) configured to receive a second version of the flow meter signal and receive the damping value from the damping adjuster (205), with the filter element (206) being further configured to damp the second version of the flow meter signal based on the damping value in order to produce a filtered flow meter signal.

2. The flow meter filter system (200) of claim 1, with the noise pass filter (203) comprising an Alternating Current (AC) coupling filter.

3. The flow meter filter system (200) of claim 1, with the noise pass filter (203) comprising a second-order Infinite Impulse Response (IIR) digital filter.

4. The flow meter filter system (200) of claim 1, wherein the noise characteristics include a maximum noise amplitude and a zero offset.

5. The flow meter filter system (200) of claim 1, wherein the damping adjuster (205) is further configured to receive an error signal generated by the filter element (206), with the error signal comprising a difference between the second version of the flow meter signal and the filtered flow meter signal.

6. The flow meter filter system (200) of claim 1, wherein the damping adjuster (205) is farther configured to receive a predetermined maximum flow value.

7. The flow meter filter system (200) of claim 1, wherein the damping adjuster (205) is further configured to divide the zero offset by the predetermined maximum flow value in order to determine whether the noise signal is substantially centered around zero.

8. The flow meter filter system (200) of claim 1, wherein the damping adjuster (205) is further configured to input the noise characteristics into a damping table in order to generate the damping value.

9. The flow meter filter system (200) of claim 1, wherein the damping adjuster (205) is further configured to generate the damping value based on the noise characteristics and on a damping delay coefficient.

10. The flow meter filter system (200) of claim 1, with the filter element (206) comprising a second-order filter.

11. The flow meter filter system (200) of claim 1, with the filter element (206) comprising an Infinite Impulse Response (IIR) digital filter.

12. The flow meter filter system (200) of claim 1, with the filter element (206) comprising a second order Infinite Impulse Response (IIR) digital filter.

13. The flow meter filter system (200) of claim 1, wherein the noise signal has a frequency in the range of about 0.025 Hz to about 1.0 Hz.

14. The flow meter filler system (200) of claim 1, wherein the noise signal comprises cyclic noise.

15. The flow meter filter system (200) of claim 1, wherein the noise signal comprises cross-talk noise.

16. The flow meter filter system (200) of claim 1, wherein the flow meter signal comprises a Coriolis flow meter signal.

* * * * *

UNITED STATES PATENT AND TRADEMARK OFFICE
CERTIFICATE OF CORRECTION

PATENT NO. : 7,257,495 B2  Page 1 of 1
APPLICATION NO. : 10/568861
DATED : August 14, 2007
INVENTOR(S) : Andrew Timothy Patten et al.

It is certified that error appears in the above-identified patent and that said Letters Patent is hereby corrected as shown below:

Column 11, line 24, replace "farther" with --further--.

Column 12, line 22, replace "filler" with --filter--.

Signed and Sealed this

Twenty-seventh Day of November, 2007

JON W. DUDAS
*Director of the United States Patent and Trademark Office*